United States Patent [19]

Sasaki et al.

[11] Patent Number: 4,731,292
[45] Date of Patent: Mar. 15, 1988

[54] MAGNETIC RECORDING MEDIUM

[75] Inventors: Kunitsuna Sasaki; Yoshitaka Yasufuku; Toshiaki Shibue; Kazumasa Matsumoto, all of Hino, Japan

[73] Assignee: Konishiroku Photo Industry Co., Ltd., Tokyo, Japan

[21] Appl. No.: 930,777

[22] Filed: Nov. 14, 1986

[30] Foreign Application Priority Data

Nov. 18, 1985 [JP] Japan .................................. 60-258840
Nov. 19, 1985 [JP] Japan .................................. 60-259526

[51] Int. Cl.$^4$ ............................................... G11B 5/702
[52] U.S. Cl. .................................. 428/425.9; 427/128; 428/694; 428/695; 428/900; 428/522; 252/62.54
[58] Field of Search ............ 428/694, 900, 695, 425.9, 428/328, 329, 522, 704, 413, 418; 427/128, 131; 252/62.54; 360/134–136

[56] References Cited

U.S. PATENT DOCUMENTS

| | | | |
|---|---|---|---|
| 4,368,237 | 1/1983 | Yamada | 428/900 |
| 4,407,901 | 10/1983 | Miyatsuka | 428/694 |
| 4,529,661 | 7/1985 | Ninomiya | 428/900 |
| 4,562,117 | 12/1985 | Kikukawa | 427/128 |
| 4,594,174 | 6/1986 | Nakayama | 428/900 |
| 4,600,521 | 7/1986 | Nakamura | 428/900 |
| 4,613,545 | 9/1986 | Chubachi | 428/900 |

Primary Examiner—Ellis P. Robinson
Attorney, Agent, or Firm—Jordan B. Bierman

[57] ABSTRACT

A magnetic recording medium is disclosed which comprises a support, and a magnetic layer comprising a specific binder resin, a fatty acid or a fatty acid ester and a magnetic particle. The binder resin comprises a monomer unit of vinyl chloride, a monomer unit having an alkalin metal salt of sulfonic acid or an alkaline salt of phosphoric acid and a monomer unit having an epoxy group. The magnetic recording medium is improved in a dispersibility of magnetic particles, a durability for still picture reproduction, a stability in running and in a S/N ratio of luminance.

11 Claims, 2 Drawing Figures

MAGNETIC RECORDING MEDIUM

FIELD OF THE INVENTION

The present invention relates to the magnetic recording media such as the magnetic tape and the magnetic sheet.

BACKGROUND OF THE INVENTION

Recently, there is an increasing tendency that the magnetic powder of finer grain size and higher magnetic property is used for the magnetic recording media especially for the video recording medium which is required to be capable of recording the short-wave signals. On the other hand, however, the smaller the grain size and the higher coercive force of the magnetic powder, the larger the cohesion of the individual grains, and this adversely affects the dispersibility and the surface smoothness of the recording medium which are necessary for adequate reproduction output of the recorded short-wave signals and the satisfactory S/N ratio. Furthermore, the recording medium using said kind of magnetic powder is vulnerable to the fall of the magnetic powder contained in the magnetic coating and the resultant clogging of the magnetic head which are detrimental to the function of the recording medium, since the repetitive use of such recording medium causes the wear of its magnetic coating.

Thus, some methods for improving the properties of the coating of the said magnetic powder have been proposed by now. Included in such methods are one featuring the improvement of the dispersibility of the magnetic powder in the binder through the adjustment of the grain size distribution of the magnetic powder, one featuring the use of the surface active agent as the dispersion medium and one featuring to change the properties of the magnetic coating through the introduction of the hydrophilic group such as the hydroxy group, phosphoric group, sulfonic group or carboxy group into the binder.

For example, there are methods such as one featuring the improvement of the surface smoothness (gloss) and the bonding strength to the backing material (of the magnetic coating) through the introduction of a metal sulfonate into the polyester resin disclosed in Japanese Patent Publication Open to Public Inspection (hereinafter referred to as Japanese Patent O.P.I Publication) No. 74824/1971 and No. 74827/1971 and another one featuring the improvement of the dispersibility and the filling property associated with the interfacial tension (of the magnetic coating) disclosed in Japanese Patent O.P.I Publication No. 13519/1971, No. 74826/1971, No. 74828/1971 and No. 74829/1971. Besides, a number of proposals have been made concerning the compositions of the binder to be obtained through the combination of the polyester resin containing the metal sulfonate, polyurethane resin, nitrocellulose and vinyl chloride resin-vinyl acetate resin.

Furthermore, the resins of the vinyl chloride resins have relatively large mechanical strengthes, and so the copolymer of vinyl chloride-vinyl acetate, the compolymer of vinyl chloride-vilidene chloride, the copolymer of vinyl chloride-acrylonitrile or the copolymer of vinyl chloride-vinyl acetate and vinyl alcohol-maleic anhydride are mainly used.

The modification of properties of the vinyl chloride resins by the metal sulfonate group has been disclosed in Japanese Patent O.P.I. Publication No. 44227/1972. According to this disclosure, first the desalting reaction is made to occur between a resin of vinyl chloride family containing OH group and a compound which, for example, contains the chlorine atom and metal sulfonate in a molecule to obtain a resin of denatured vinyl chloride family into which sulfonic acid metal salt residual group is introduced.

A copolymer vinyl chloride family containing the free sulfo group ($-SO_3H$) is disclosed in Japanese Patent O.P.I. Publication No. 108032/1973.

Such a vinyl chloride copolymer obtained from the polymerized monomer containing the free sulfo group is sometimes advantageous as to the dispersibility of the magnetic powder but tends to increase its viscosity so rapidly before the cating following the dispersion that the coating becomes impossible in many instances.

SUMMARY OF THE INVENTION

The object of the present invention is to provide a magnetic recording medium consisting of the material featuring its good dispersibility and durability and its magnetic layer featuring its good lubrication, good durability for still picture reproduction (termed "still durability" hereinafter), good stability in running and good S/N ratio.

The above-mentioned object is accomplished by a magnetic recording medium comprising a support and, provided thereon, a magnetic layer comprising a monomer unit of vinyl chloride, a monomer unit having an alkaline metal salt of sulfonic acid or an alkaline metal salt of phosphoric acid and a monomer having an epoxy group, a fatty acid or a fatty acid ester and a magnetic particle.

BRIEF DESCRIPTION OF THE DRAWING

The drawings illustrate the embodiments of the present invention.

DETAILED DESCRIPTION OF THE INVENTION

Figure 1:
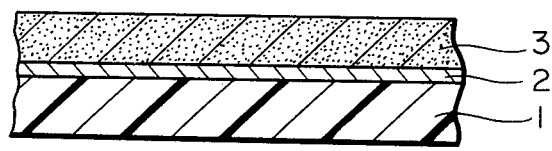
FIG. 1 and FIG. 2 are the partially enlarged cross-sectional views of two different magnetic tapes respectively.

According to the present invention, the binder contains the sulfonic acid and/or phosphoric acid, in the form of alkaline metal salt and epoxy group, and this reduces the viscosity of the magnetic coating material, so that the dispersibility of the magnetic pwder is improved, and the surface smoothness of the magnetic layer is improved as a result. Furthermore, the fatty acid or the fatty acid ester contained in the magnetic layer are found not only to reduce the coefficient of dynamical friction but also increase the still durability of the layer. It is also found that the epoxy group contained in the binder stabilizes the running (of the magnetic layer).

The binder according to the present invention can be obtained by copolymerizing vinyl chloride monomer, a monomer which contains sulfonic acid or alkali salt of phosphoric acid, and a monomer having epoxy group, and adaptable to complymerization and, if necessary, other kind of monomer adaptable to copolymerization. As for such monomers, those containing vinyl group are preferable. Such monomer can be formed easily through the vinyl synthesization process, and the combination of the components of copolymerization can be varied, so that the properties of the desired copolymer can be adjusted for optimum properties.

The metal in sulfonic acid salt or phosphoric acid salt is an alkali metal (especially sodium, potassium, rithium), and potassium is preferable in terms of solubility, reactivity and yield.

The monomers containing sulfonic acid and adaptable to copolymerization as are mentioned above include, $CH_2=CHSO_3M$,
$CH_2=CHCH_2SO_3M$,
$CH_2=C(CH_3)CH_2SO_3M$,
$CH_2=CHCH_2OCOCH(CH_2COOR)SO_3M$,
$CH_2=CHCH_2OCH_2CH(OH)CH_2SO_3M$,
$CH_2=C(CH_3)COOC_2H_4SO_3M$,
$CH_2=CHCOOC_4H_8SO_3M$,
$CH_2=CHCONHC(HC_3)_2CH_2SO_3M$.

As the monomers containing phosphoric acid salt there are $CH_2=CHCH_2OCH_2CH(OH)CH_2-O-PO_3MY^1$,
$CH_2=CHCONHC(CH_3)_2CH-O-PO_3MY^2$,
$CH_2=$

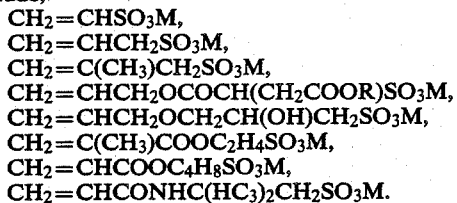

$CH_2=CHCH_2O(CH_2CH_2O)mPO_2MX^2$.

In the above, M represents alkali metal; R is alkyl group with 1 to 20 carbon atoms; $Y^1$ is H, M or $CH_2=CHCH_2OCH_2CH(OH)CH_2-$; $Y^2$ is H, M or $CH_2=CHCONHC(CH_3)_2CH_2-$; $X^1$ is $CH_2=$

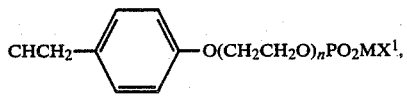

OH or OM,
$X^2$ is $CH_2=CHCH_2O(CH_2CH_2O)m-$, OH or OM, n is an integer of 1 to 100 and m is an integer of 1 to 100.

As the monomers adaptable to copolymerization which can be copolymerized when necessary, there are known monomers adaptable to copolymerization. For example, there are various kinds of vinyl ester such as vinyl acetate, vinylidene chloride acryl nitrile, methacrylonitrile, styrene, acrylic acid, methacrylic acid, various kinds of acrylic ester, acrylate, methacrylate, ethylene, propylene, isobutane, butadiene, isoprene, vinyl ether, aryl ether, aryl ester, acrylamide, methacrylamide, maleic acid and maleate.

According to the present invention, the above binders are polymerized by the methods such as the emulsion polymerization, solution polymerization, suspension polymerization and block polymerization. In any of such polymerization methods, the prior arts such as divided or continuous addition of the molecular weight control agent, polymerization initiator and monomers are applicable when necessary.

In the above-mentioned copolymers being used in the invention, if the aforementioned monomers each containing an alkali-salt of sulfonic acid or phosphoric acid is in an amount of less than 0.1% by weight, the dispersibility of magnetic powders will become unadequate. If exceeding 4.0% by weight, the hydrophilic property of a strong acid radical will be so greater that the dissolving property to a solvent will be unsatisfactory and the moisture resistance of a coated layer will also be lowered and, in addition, the magnetic powders will further cohere, so that the dispersibility will get all the worse.

The copolymer of vinyl chloride of the invention contains a monomer unit having an epoxy group.

The monomer unit containing an epoxy group is able to improve the heat stability of the vinyl chloride copolymer and, at the same time, the binders are made to have a high molecular weight by linking the binders with each other upon reacting the monomers with such a cross linkage hardener as an isocyanate or the like and, further, the monomers take part in the bonding of the other binder resins such as a polyurethane and the like so as to prevent a magnetic layer from dehydrochlorination as well as to improve the magnetic layer upon such a resistivity as heat stability, antiabrasion property and the like. These monomers are also effective in adjusting a glass-transition temperature (Tg) and plasticizing effects of binder resins when properly changing a content of the monomer units having an epoxy group.

The components each having the above-mentioned epoxy group include, for example, a glycidyl ether of an unsaturated alcohol, such as allylgrycidyl ether or methallylglycidyl ether; a glycidyl ester of an unsaturated acid, such as glycidyl acrylate, glycidyl methacrylate, glycidyl-p-vinylbenzoate, methylglycidyl itaconate, glycidyl ethylmaleate, glycidyl vinyl-sulfonate, glycidyl(metha)allylsulfonate or the like; an epoxide oleffin such as butadiene monoxide, vinylcyclohexene monoxide, 2-methyl-5, 6-epoxyhexene or the like.

The above-mentioned monomers are generally used in an amount of not less than 0.5% by weight in terms of an amount of the epoxy group in the copolymers used. If this monomer content is less than 0.5% by weight, a heat-resisting stability and cross-linking reactivity will be lowered.

The copolymer of vinyl chloride of the invention is preferred to contain a monomer unit having hydroxy group. In general, as the hard components of the binder, for example, of the videotape, the copolymer of vinyl chloride and vinyl asetate are used, and such hard components are used in combination with polyurethane as a soft component. The copolymer of vinyl chloride and vinyl acetate is obtained by partial hydrolysis and can be expressed as

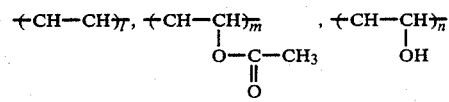

where the group of $CH_3CO-O-$ is hard to contribute to the bridge formation reaction with the hardening agent. Thus, the present invention proposes to use an unsaturated compound containing an alkali salt of sulfonic acid or phosphoric acid according to the present invention as one of the components of the copolymer or as a binder which maintains the properties of vinyl chloride-vinyl acetate copolymer obtained by partial hydrolysis desirable for the magnetic medium and provides desirable dispersibility, bridge formation reactivity (other agent than bridge forming agent may be used) and surface flatness, and the present invention also proposes to let (said binder) contain

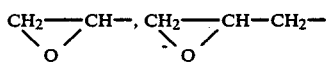

instead of CH₃CO. The monomer unit of said binder, for example, is as follow:

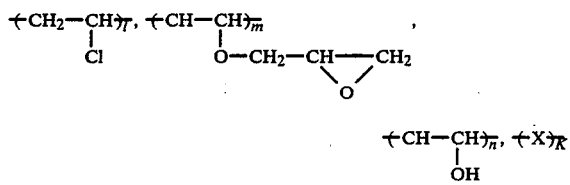

X: Monomer unit portion containing alkali metal salt of sulfonic acid or phosphoric acid.

The components each containing the above-mentioned hydroxy group are, for example, an Alkanol ester of a β-unsaturated acid, which has 2 to 4 carbon atoms, such as 2-hydroxyethyl(metha)acrylate, 2-hydroxypropyl(metha)acrylate or the like; an Alkanol ester of an unsaturated dicarboxylic acid, such as 2-hydroxypropyl monomaleate, 2-hydroxypropyl dimaleate, 2-hydroxybutyl monoitaconate or the like; an olefin type alcohol such as 3-butene-1-ol, 5-hexene-1-ol or the like; an Alkanol vinyl ether such as 2-hydroxyethyl vinyl ether, 2-hydroxypropyl vinyl ether or the like; an acryl amide such as N-methylolacrylamide, N-methylolmethacrylamide or the like.

An amount of the hydroxyl group based on the —OH group coupled to a resin is, preferably, from 0.1 to 2.0% by weight.

The copolymer of vinyl chloride as the binder is preferred to be used in combination with the urethane resin which increases the durability of the magnetic medium. Preferable average molecular weight (Mw) of the urethane resin is in the range from 20,000 to 60,000 measured by GPC method.

The various conventional resins may also be used together with (the urethane resin). The thermoplastic resins which may be used in combination with (the binder) are preferred to have the softening temperature of under 150° C., average molecular weight of about 10,000 to 200,000 and the polymerization degree of about 200 to 2,000. For example, the thermoplastic resins falling under this category are vinyl chloride-vinyl acetate copolymer, vinyl chloride-vinylidene chloride, vinyl chloride-acrylonitril copolymer, acrylate-acrylonitril copolymer, acrylate-vinylidene chloride copolymer, acrylatestyrene copolymer, methacrylate-acrylonitril copolymer, methacrylate-vinylidene chloride copolymer, methacrylatestyrene copolymer, poly vinyl fluoride, vinylidene chlorideacrylonitril copolymer, butadiene-acrylonitril copolymer, polyamide resin, poly vinyl butyral derivatives of cellulose such as cellulose acetate butyrate, cellulose diacetate, cellulose triacetate, cellulose propionate, nitrocellulose, styrene-butadiene copolymer, polyester resin, chlorovinyl ether-acrylate copolymer, amino resin, various thermoplastic resins of synthetic rubber family and their mixtures.

As for the thermoplastic resins or the reactive resins, those whose molecular weights in the state of the coating solution are preferred to be less than about 200,000, but the molecular weight becomes infinite through the reactions such as the condensation and the addition.

Furthermore, of these resins, those which will not soften or melt before the thermal decomposition of the resin are preferred. More particularly, for example, the phenol resin, epoxy resin, urea resin, melamine resin, alkyd resin, silicone resin, reactive acryl resin of acryl, mixture of high molecular polyester resin and isocyanate prepolymer, mixture of methacrylate copolymer and diisocyanate prepolymer, mixture of polyester polyol and polyisocyanate, urea formaldehyde resin, mixture of low molecular weight glycol/high molecular weight diol/triphenyl methane triisocyanate, polyamine resin and its mixtures are preferred.

The above-mentioned resins may be those containing the hydrophilic polar groups such as —SO₃M, —O-SO₃M, —COOM and —PO(OM')₂ (Note: M should be hydrogen or alkali metal; M' should be hydrogen, alkali metal or the residue of hydrocarbon).

As for the compounding ratio of the copolymer of vinyl chloride and urethane resin allowed according to the present invention, the copolymer of vinyl chloride according to the present invention is preferred to be 90 to 10 parts by weight and more preferred to be 80 to 20 parts by weight. When the above-mentioned compound ratio exceeds 90 parts by weight, the coating becomes so brittle that the durability of the coating is markedly deteriorated and the bonding strength of the coat to its support is also reduced. Also, when the compound ratio is less than 10 parts by weight, the magnetic powder becomes more prone to fall.

Furthermore, the durability of the magnetic coating material containing the binder according to the present invention can be increased by adding a polyisocyanate type hardening agent. As such hardening agents of polyisocyanate, there are, for example, di-functional isocyanates such as tri-range isocyanate, diphenyl methane diisocyanate and hexane diisocyanate, tri-functional isocyanates such as Collonate L (Product of Nippon Polyurethane Kogyo Co., Ltd.) and Desmodur L (Product of Byer), the conventional hardening agents such as urethane prepolymer containing isocyanate group at both ends and any isocyanate which can be used as a hardening agent. The quantity of polyisocianate type hardening agent should be 5 to 80 parts by weight of the total quantity of the binder.

The above fatty acid to be used according to the present invention may be either monobasic or dibasic. The number of carbon atoms is preferred to be 6 to 30, and fatty acid of 10 to 22 are preferred. The examples of the fatty acids are as follows:

(1) Caproic acid
(2) Caprylic acid
(3) Capric acid
(4) Lauric acid
(5) Myristic acid
(6) Palmitic acid
(7) Stearic acid
(8) Isostearic acid
(9) Linolenic acid
(10) Linolic acid
(11) Oleic acid
(12) Elaidic acid
(13) Behenic acid
(14) Malonic acid
(15) Succinic acid
(16) Maleic acid
(17) Glutalic acid
(18) Adipic acid

(19) Pimelic acid
(20) Aselaic acid
(21) Sebacic acid
(22) 1, 12-dodecanedicarboxylic acid
(23) Octane dicarboxylic acid The examples of the fatty acid esters allowed to be used according to the present invention are as follows:
(1) Oleyl oleate
(2) Isocetyl stearate
(3) Dioleyl maleate
(4) Butyl stearate
(5) Butyl palmitate
(6) Butyl myristate
(7) Octyl myristate
(8) Octyl palmitate
(9) Amyl stearate
(10) Amyl palmitate
(11) Isobutyl oleate
(12) Stearyl stearate
(13) Laurylic oleate
(14) Octyl leate
(15) Isobutyl oleate
(16) Methyl leate
(17) Isotridcyl leate
(18) 2-ethyl hexyl stearate
(19) Methyl stearate
(20) 2-ethyl hexyl palmitate
(21) Isopropyl palmitate
(22) Isopropyl myristate
(23) Methyl laurate
(24) 2-ethyl hexyl cetylate
(25) Dioleyl adipate
(26) Diethyl adipate
(27) Diisobutyl adipate
(28) Diisodecyl adipate
(29) Isooctyl palmitate
(30) Isooctyl myristate
(31) Isocetyl stearate The contents of these fatty acids and fatty acid esters to 100 parts by weight of the magnetic powder range from 0.5 to 20 wt% and more preferably from 1 to 10 wt%. When the content of any of these fatty acids or fatty acid esters is less than the specified wt%, the presence of such fatty acid or fatty acic ester becomes useless, whereas when its content exceeds the specified wt%, it tends to exude or cause the fall of the output of the magnetic recording medium.

Each of the aforementioned fatty acids or fatty acid esters may be used alone, or the fatty acid and fatty acid ester may be used in combination. When using a fatty acid and a fatty acid ester in combination, the weight percentage of the fatty acid is preferred to be equal to or more than the weight percentage of the fatty acid ester.

When a fatty acid and fatty acid ester are used in combination, the properties of the both contribute to the improvement of the lubrication effect, the stability of still picture, running stability and S/N ratio of the magnetic recording medium.

The magnetic layer according to the present invention is preferred to have the coefficient of dynamical friction adjusted to less than 0.30° at 25° C. When this coefficient of friction exceeds 0.30, the running performance and high still durability (of the magnetic recording medium) tend to fall substantially.

FIG. 1 shows a magnetic recording medium, for example, a magnetic tape according to the present invention which consists of a support 1, a subbing layer 2 (this layer may not be provided depending on the situation) provided on the support 1 and a magnetic layer 3. According to the present invention, the magnetic layer 3 is supposed to contain the binder, fatty acid, fatty acid ester and magnetic powder.

Figure 2:
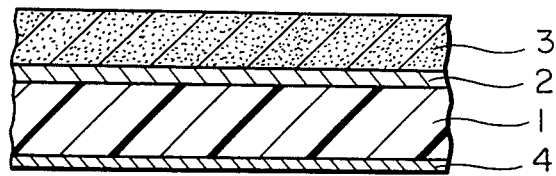

The support 1 is preferred to have a backcoat 4 antistatic and antitransfer purposes on one of its sides which is opposite to the side on which the magnetic layer is provided as shown in FIG. 2.

As the magnetic powder especially the ferromagnetic powder to be used for the magnetic layer, the iron oxide magnetic powders such as $\gamma-Fe_2O_3$, $\gamma-Fe_2O_3$ containing Co, $Fe_3O_4$ and $Fe_3O_4$ containing Co; the metallic magnetic powders mainly consisting of Fe, Ni and Co such as Fe, Ni, Co, Fe—Ni—Co alloy, Fe—Mn—Zn alloy, Fe—Ni—Zn alloy, Fe—Co—Ni—Cr alloy, Fe—Co—Ni—P alloy and Co—Ni alloy; and $CrO_2$ can be enumerated.

Besides the ferromagnetic powders, the dispersing agent, lubricating agent, abrasives and antistatic agent as the additives may be added to the magnetic layer.

As the dispersing agents, phosphoric esters are preferable.

As the phosphates are represented by the following General Formulas, respectively:

General Formula (I):
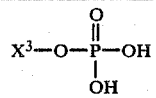

General Formula (I'):
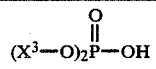

(in the General Formulas, $X^3$ represents an organic group), and these phosphates may be used provided that they contain a phophoric acid hydroxyl group (or the salts thereof). The phosphoric acid esters which are preferably useful for the invention include those represented by the following General Formula:

General Formula (II):
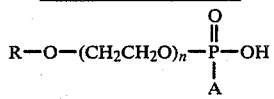

wherein R represents an alkyl group, an alkenyl group, an aryl group or an alkylaryl group and, more preferably, those each having 4 to 30 carbon atoms. It is also preferable that they contain an alkenyl group or an aromatic ring, respectively; A represents an OH group or an $R-O-(CH_2CH_2O)_n-$; and n is an integer of from 2 to 50.

Next, the typical examples of the phosphates each represented by the above-given General Formulas (I), (I') and (II) will be given below:

   (P-1)
(P-2)

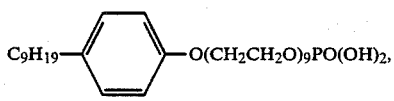   (P-3)

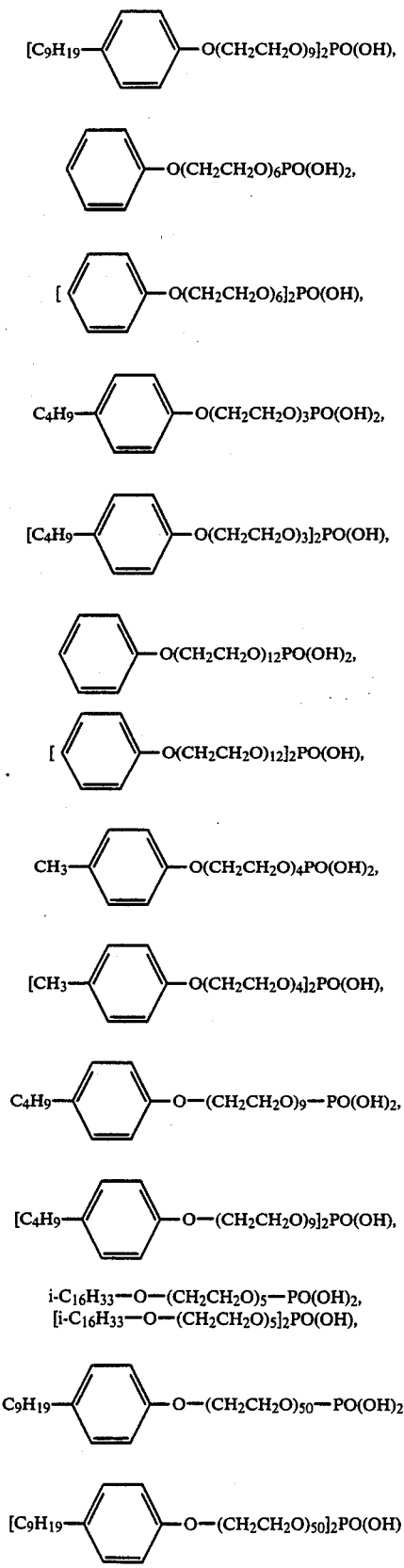

-continued (P-4) of such dispersing agents should be added in the quantity of 0.5 to 20 parts by weight to 100 parts by weight of the magnetic powder.

As the lubricating agents, the following compounds may be used; the silicon oils such as dialkyl polysiloxane (Number of carbon atoms in alkyl; 1 to 5), dialkyl poly-
(P-5) siloxane modified by COOR (R is a hydrogen atom or alkyl group with $C_1 \sim C_{20}$), dialkoxy polysiloxane (Number of carbon atoms in alkoxy: 1 to 4), monoalkyl monoalkoxy polysiloxane (Number of carbon atoms in alkyl: 1 to 5; Number of carbon atoms in alkoxy: 1 to 4),
(P-6) phenyl polysiloxane, fluoroalkyl polysiloxane (Number of carbon atoms in alkyl: 1 to 5); electrical conductive powder such as the graphite powder, powder of inorganic materials such as tungsten disulfide; polyethylene, polypropylene and polyethylene-vinyl chloride copoly-
(P-7) mer; α-olefin polymer; powders of plastic materials such as polytetrafluoroethylene; α-olefin polymer; hydrocarbon of unsaturated aliphatic hydrocarbon which is in liquid state at normal temperature (Compound formed with n-olefin double bond bonded to terminal carbon; number of carbon atoms; about 20); fluorocar-
(P-8) bons. Each of these lubricating agents should be added in the quantity of 0.2 to 30 parts by weight to 100 parts by weight of the magnetic powder.

As for the abrasives, the conventional abrasives such
(P-9) as the alumina, silicon carbide, chromium oxide ($Cr_2O_3$), corundum, artificial corundum, diamond, artificial diamond, garnat, emery (Main components; Corundum and magnetits) may be used. Each of these
(P-10) abrasives is preferred to have the Moh's hardness of more than 5 and average grain size of 0.05 to 5 μm.

It is desired in the invention to use the first kind of abrasives having an average particle size of not larger than 0.5 μm (and, more preferably, not smaller than 0.1
(P-11) μm) and the other kind thereof having an average particle size of larger than 0.5 μm (and, more preferably, not larger than 0.8 μm).

One of the preferable embodiments of the latter particles is to make up of the particles having a size of not
(P-12) smaller than 1 μm in an amount of from 5 to 30% by weight. A proportion of mixing the two sized particles together, i.e., a ratio by weight (a) of the 2nd abrasive to the 1st abrasive, is to preferably be lower than 1.0 and, more preferably, be $0.01 \leq a < 1.0$.
(P-13) Each of these abrasives should be added in total in the quantity of 0.5 to 20 parts by weight to 100 parts by weight of the magnetic powder.

As for the antistatic agents, the following materials
(P-14) may be used; electrically conductive powders of carbon black and carbon black graft polymer; natural surface active agent such as saponin; nonionic surface active agents of alkylene oxide, glycerol and glycidol types; heterocyclic compounds such as higher alkylamines, quaternary ammonium salts and pyridine; cationic sur-
(P-15) face active agent such as phosphoniums; anionic surface
(P-16) active agents containing a acidic group such as calboxylic acid, sulfonic, phosphonio, sulfate and phosphate
(P-17) group; and amphoteric surface active agents such as amino acids, amino sulfonic acids and sulfates of phosphates of amino alcohol. Each of aforementioned electrically conductive powder should be added in the
(P-18) quantity of 0.2 to 20 parts by weight to 100 parts by weight of the magnetic powder, and each of the surface active agents in the quantity of 0.1 to 10 parts by weight. Each of these surface active agents may be added either alone or in combination with other surface active agent. These (surface active agents) are primarily used as the antistatic agents, but, sometimes, they are used for other purposes such as the facilitation of dispersion (of the magnetic powder), improvement of magnetic peoperty, improvement of lubrication and facilitation of coating (assistant).

Besides the aforementioned additives, the following additives may also be used, since they contribute to the increase of the rustproof effect; phosphoric acid, sulfamide, pyridine, amine, urea, zinc chromate, calcium chromate, strontium chromate, especially, inorganic acid salts or organic acid salts of amine, amide or imide such as dicyclohexyl amine nitrite, cyclohexylamine chromate, diisoproplamine nitrite, diethanolamine phosphate, cyclohexylammonium carbonate, hexamethylenediamine carbonate, propylenediamine stearate, guanidine carbonate, triethanolamine nitrite, morpholine stearate. Each of these additives should be added in the quantity of 0.01 to 20 parts by weight to 100 parts by weight of the ferromagnetic powder.

The magnetic layer consists of a magnetic coating material mixed with an orgnic solvent which is applied to the surface of the support. As the solvents of the magnetic coating material, the following solvents may be used; ketone such as acetone, methylethyl ketone, methyl isobutyl ketone, cyclohexanone; alcohol such as methanol, ethanol, propanol, butanol; ester such as methyl acetate, ethyl acetate, butyl acetate, ethyl lactate, glycol acetate monoethyl ether; glycol ether such as ethylene glycol diethyl ether, dioxane; aromatic hydrocarbon such as benzene, toluene, xylene; aliphatic hydrocarbon such as hexane, butane and nitropropane. The support on which the magnetic coating material is applied may be made of the following materials; polyester such as polyethylene terephtalate, polyethylene-2,6-naphtalate; polyolefin such as polyethylene, polypropylene; derivatives of cellulose such as cellulose triacetate, cellulose acetate butylate, cellulose acetate propionate; polycarbonate, polyvinyl chloride, polyimide, polyamide, polyhydrasides, metals such as aluminium, copper and paper.

EXAMPLES

The embodiments of the present invention will be explained in the following. The components, ratios and sequences of the processes which will be discussed in the following may be altered in various ways unless they will not deviate substantially from the scope the present invention. In the following examples of the embodiment, the term "part" always means "part by weight".

EXAMPLE 1

Demineralized water of 300 parts, 25 parts of allylglycidyl ether, 5 parts of potassium persulfate, 2 parts of potassium 3-allyloxy-2-hydroxypropanesulfonate and 0.7 parts of potassium hydroxide were put into an autoclave and degassed, and 100 parts of vinyl chloride were added thereinto and a polymerization was started at 42° C. At the same time when the polymerization was started, 8 parts of 2-hydroxyethyl methaacrylate were added continuously into the autoclave and when a pressure of the autoclave was at 3 kg/cm$^2$, a temperature was raised to 80° C. and the temperature was kept at 80° C. for 3 hours while the unreacted vinyl chlorides were being collected. Thereafter, the resulted matter was freezed, solidified, washed and dried up in succession, so that a resin was obtained.

The resin is named Binder A, and the following magnetic coating material was prepared.

| | |
|---|---|
| Binder-A | 15 parts |
| Polyurethane (Mw ≈ 40,000) | 7 parts |
| Co—γ-Fe$_2$O$_3$ | 100 parts |
| Dispersing agent (phosphoric ester*) | 3 parts |
| Alumina | 1 part |
| Carbon black | 6 parts |
| Fatty acid (Palmitic acid) | 1 part |
| Fatty acid ester (Isooctyl palmitate) | 1 part |
| Cyclohexanone | 150 parts |
| Methylethyl ketone | 70 parts |
| Toluene | 30 parts |

*Dispersing agent is a mixture of phosphoric ester

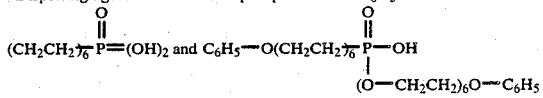

The above components were set in a ball mill and dispersed. Then, 5 parts of trifunctional isocyanate was added to the coating material, and the coating material was applied to the surface of the support so that the coating of 5 μm thick is formed. Then, the coating was treated with the supercalender, then cured at 60° C. for 24 hours and the support was slit into the videotapes of ½" wide.

EXAMPLE 2

In this example, the processes defined in Example 1 were followed except that a binder of the vinyl chloride resin consisting of the copolymer content of the unsaturated compound containing the alkali metal of phospho group instead of Binder-A used in the case of Example 1 (The binder used in Example 2 is named Binder-B, which was obtained by substituting CH$_2$=CHCONHC(CH$_3$)$_2$CH$_2$OPO$_3$K$_2$ for 0.5 parts by weight out of 6 parts of CH$_2$=CHCH$_2$OCOCH(SO$_3$K)CH$_2$COOC$_8$H$_{17}$ which in Binder-A used in Example 1).

EXAMPLE 3

In this example, the processes defined in Example 1 were followed except that the fatty acid was removed, and 2 parts of fatty acid ester was used in the case of Example 1.

EXAMPLE 4

In this example, the processes defined in Example 1 were followed except that the fatty acid ester was removed, and 2 parts of fatty acid was used in the case of Example 1. In this example, oleic acid was used instead of palmitic acid.

EXAMPLE 5

In this example, the processes defined in Example 1 were followed except that a binder of a vinyl chloride resin which contains epoxy group and the copolymer component of unsaturated compound containing the alkali metal of sulfo group instead of Binder-A used in the case of Example-1 (The vinyl chloride resin containing epoxy group is called Binder-C, which was obtained by making

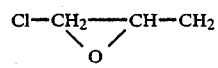

react on the obtained copolymer components) (In this example, $CH_2=CH-CONH-C(CH_3)_2CH_2SO_3K$ is substituted for 1 part by weight out of 6 parts by weight of $CH_2=CHCH_2OCOCH(SO_3K)CH_2COOC_8H_{17}$ which is Binder A).

EXAMPLE 6

The following components were prepared using the Binder-A.

| | |
|---|---|
| Binder-A | 15 parts |
| Polyurethane (Mw = 40,000) | 7 parts |
| Co-γ-Fe$_2$O$_3$ | 100 parts |
| Dispersing agent the same as Ex. 1 | 1 part |
| Carbon black | 2 parts |
| Chromium oxide | 2 parts |
| Fatty acid (Oleic acid) | 1 part |
| Fatty acid ester (acetyl palmitate) | 0.5 part |
| Cychlohexanone | 150 parts |
| Methylethyl ketone | 70 parts |
| Toluene | 30 parts |

The above components were set in a ball mill and dispersed. Then, 5 parts of trifunctional isocyanate was added to the coating material. The coating material was applied in 5 μm thickness on the surface of the support, using the reverse roll coater, and the surface of the coating was processed by the supercalender and cured in the same manner as Example 1. The coated support was then slit into the videotapes of ½" wide.

EXAMPLE 7

In this example, the processes defined in Example 6 were followed except that Binder-B was used instead of Binder-A used in Example 6.

COMPARATIVE EXAMPLE 1

Binder D described was prepared as follows:

An autoclave having a capacity of 500 ml and being attached with an electromagnetic induction type stirrer and a pressure gage was added thereinto with 300 ml of nitrogen-substituted distilled water into which 0.6 g of polyvinyl alcohol were dissolved in advance, 0.15 g of azobisisobutylonitrile, 10.0 g of vinyl acetate and 8.0 g of 2-acrylamido-2-methylpropane sulfonic acid, and the clave was closed and cooled down to −20° C. in a dry-ice-methanol bath.

Next, a nitrogen-substitution was made by blowing nitrogen gas into the clave and 100 g of cooled and liquid vinyl chloride were quickly added thereinto by making use of an adequately cooled funnel. The temperature in the clave was raised to 60° C. by spending about 15 minutes and a polymerization was made with stirring. At the point of time when the pressure in the clave got lowered, the polymerization was made to be completed. Thereafter, the temperature in the clave was cooled down to an ordinary temperature and the remaining vinyl chloride monomers were removed therefrom. Then, a substitution was made with nitrogen gas to produce a white powdered polymers. The resulted white powdered polymers were well washed, suction-filtrated and then vacuum-dried at 40° C. for 12 hours. The yield of the resulted binder was 93.0 g. According to the elementary analysis and alkalimetry thereof, the copolymerization ratio (i.e., the mol ratio) of vinyl acetate to 2-acrylamido-2-methylpropanesulfonic acid was 90.0:7.5:2.5.

Binder D was used instead of Binder A used in Example 1.

COMPARATIVE EXAMPLE 2

The processes defined in Example 1 were followed except that the fatty acid and the fatty acid ester were removed.

COMPARATIVE EXAMPLE 3

The processes defined in Example 2 were followed except the fatty acid and the fatty acid ester used in Example 2.

As for the magnetic coating material obtained by the processed defined in the foregoing examples and comparative examples, its viscosity is measured, and, as for the videotape manufactured using this magnetic coating material, its coefficient of dynamical friction, jitter, S/N ratio of luminance signal and still mode durability are measured. The result of measurement is as shown in Table 1.

The properties of the coating material and the videotape are measured by the following methods:

Viscosity of coating material

Measured with B-type viscometer (60 r.p.m) at 25° C.

Coefficient of dynamical friction

When the ambient temperature is 25° C., the videotape was wound by 180° around the chrome-plated stainless 4ϕ pin of the tape running performance testing machine TBT-300 D (at Yokohama System Research Institute), and the coefficient of dynamical friction was measured at the tape speed of 1 cm/sec and the entrance tension of 20 g. Then, μk was calculated by the following formula:

$$\mu k = \frac{1}{\pi} \ln \frac{X}{20} \quad (x: \text{tension at exit (g)})$$

Jitter

Measured with VTR jitter maker MK 612 A (Product of Meguro Denpa).

S/N ratio of luminance signal

Measured with NTSC color video noise meter 925 R/1, and the relative value to that defined in comparative Example 2 is 0 was shown.

Still mode durability

The test piece is set in the videotape recorder, and the duration required until the time when RF output falls by 1 dB while the videotape recorder was operated in still mode.

TABLE 1

| | Kind of vinyl chloride resin | Amount of fatty acid (weight part) | Amount of fatty acid ester (weight part) | Viscosity of coating material (pois) | Dynamic friction coefficient (μK) | Jitter (μsec) | Luminesence signal S/N (dB) | Still mode durability (min) |
|---|---|---|---|---|---|---|---|---|
| Example | | | | | | | | |

TABLE 1-continued

|  | Kind of vinyl chloride resin | Amount of fatty acid (weight part) | Amount of fatty acid ester (weight part) | Viscosity of coating material (pois) | Dynamic friction coefficient ($\mu K$) | Jitter ($\mu sec$) | Luminescence signal S/N (dB) | Still mode durability (min) |
|---|---|---|---|---|---|---|---|---|
| 1 | A | 1 | 1 | 20 | 0.22 | 0.06 | +2.0 | over 120 |
| 2 | B | 1 | 1 | 18 | 0.21 | 0.05 | +1.8 | over 120 |
| 3 | A | — | 2 | 22 | 0.24 | 0.06 | +1.4 | over 120 |
| 4 | A | 2 | — | 18 | 0.20 | 0.06 | +1.5 | over 120 |
| 5 | C | 1 | 1 | 19 | 0.19 | 0.05 | +2.1 | over 120 |
| 6 | A | 1 | 0.5 | 20 | 0.18 | 0.06 | +2.5 | over 120 |
| 7 | B | 1 | 0.5 | 17 | 0.18 | 0.06 | +2.6 | over 120 |
| Comparative example | | | | | | | | |
| 1 | D | 1 | 1 | 55 | 0.26 | 0.12 | −0.5 | 60 |
| 2 | A | — | — | 23 | 0.38 | 0.18 | 0 | 5 |
| 3 | B | — | — | 20 | 0.35 | 0.20 | +0.2 | 5 |

The results of measurements shown in Table 1 respectively indicate that the magnetic powder prepared according to the present invention has a good dispersibility, and the magnetic layer formed according to the present invention has good running performance, durability, magnetic property and electrical property.

What is claimed is:

1. A magnetic recording medium comprising a support and, provided thereon, a magnetic layer comprising
   (a) copolymer resin comprising a monomer unit of vinyl chloride, a first monomer unit having an alkali metal salt of sulfonic acid or an alkali metal salt of phosphoric acid, a second monomer unit having an epoxy group, and a third monomer unit having a hydroxy group;
   (b) a fatty acid or a fatty acid ester;
   (c) magnetic particles; and
   (d) a polyurethane resin; said polymer is present in the ratio of from 90 to 10 parts by weight of said copolymer to 100 parts of said copolymer plus said polyurethane.

2. The medium of claim 1 wherein (b) is present in an amount of 0.5 to 20% by weight based on said magnetic particles, said first monomer unit being present in an amount of from 0.1 to 4.0% by weight based on the total monomer units of said copolymer resin.

3. The magnetic recording medium of claim 1, wherein the total content of said monomer unit having an alkali metal salt of sulfonic acid or an alkali metal salt of phosphoric acid is in the range of from 0.1% to 4% by weight of total monomer units of said polymer resin.

4. The medium of claim 2 wherein said (b) is present in an amount of 1.0 to 10% by weight based on said magnetic particles.

5. The magnetic recording medium of claim 1, wherein a weight average molecular weight Mw of said polyurethane resin is in the range of from 20,000 to 60,000.

6. The magnetic recording medium of claim 1, wherein the total content of said fatty acid or said fatty acid ester is in the range of from 0.5% to 20% by weight of said magnetic particle.

7. The magnetic recording medium of claim 1, wherein said magnetic layer contains both of said fatty acid and said fatty acid ester.

8. The magnetic recording medium of claim 1, wherein an amount by weight of said fatty acid is more than that of said fatty acid ester.

9. The magnetic recording medium of claim 1, wherein magnetic layer contains a phosphoric ester.

10. The magnetic recording medium of claim 1, wherein a coefficient of dynamical friction $\mu k$ is not more than 0.3.

11. The medium of claim 2 wherein said magnetic layer was a coefficient of dynamic friction of less than 0.30 at 25° C.

* * * * *